(12) United States Patent
Mattern et al.

(10) Patent No.: US 10,926,954 B2
(45) Date of Patent: Feb. 23, 2021

(54) PICKING SYSTEM

(71) Applicant: LIEBHERR-VERZAHNTECHNIK GMBH, Kempten (DE)

(72) Inventors: Thomas Mattern, Rieden (DE); Michael Kluge, Kempten (DE)

(73) Assignee: LIEBHERR VERZAHNTECHNIK GMBH, Kempten (DE)

( * ) Notice: Subject to any disclaimer, the term of this patent is extended or adjusted under 35 U.S.C. 154(b) by 110 days.

(21) Appl. No.: 16/322,802

(22) PCT Filed: Aug. 4, 2016

(86) PCT No.: PCT/EP2016/001347
§ 371 (c)(1),
(2) Date: Feb. 1, 2019

(87) PCT Pub. No.: WO2018/024311
PCT Pub. Date: Feb. 8, 2018

(65) Prior Publication Data
US 2019/0185266 A1    Jun. 20, 2019

(51) Int. Cl.
*B65G 1/137* (2006.01)
*G06Q 10/08* (2012.01)
(Continued)

(52) U.S. Cl.
CPC .......... *B65G 1/1373* (2013.01); *B25J 9/1697* (2013.01); *B65G 1/0435* (2013.01);
(Continued)

(58) Field of Classification Search
CPC combination set(s) only.
See application file for complete search history.

(56) References Cited

U.S. PATENT DOCUMENTS

| 9,242,799 B1* | 1/2016 | O'Brien ................ G06Q 10/08 |
| 9,958,851 B2 | 5/2018 | Mattern et al. |
| 2014/0108998 A1 | 4/2014 | Chaudhri et al. |

FOREIGN PATENT DOCUMENTS

| EP | 0235488 A1 | 9/1987 |
| EP | 1980503 A1 | 10/2008 |
| EP | 2952297 A2 | 12/2015 |

OTHER PUBLICATIONS

ISA European Patent Office, International Search Report Issued in Application No. PCT/EP2016/001347, dated Apr. 18, 2017, WIPO, 10 pages.

* cited by examiner

*Primary Examiner* — Kyle O Logan
(74) *Attorney, Agent, or Firm* — McCoy Russell LLP (57) ABSTRACT

The present invention relates to a picking system for order-related picking of goods stockpiled in racks, with an automated picking cell including a gripper for gripping and picking the goods and a cell control unit for actuating the gripper, with a transport system for conveying the racks to a picking position near the picking cell, wherein the racks have shelves and/or containers on and/or in which goods are stored, wherein at least one shelf and/or container of a rack arranged in the picking position can be conveyed from a storage position inside the rack into a removal position in which the at least one shelf and/or container is at least partially arranged in front of the rack, wherein the gripper is actuated by the cell control unit to grip the goods stockpiled on the shelf and/or in the container while the shelf and/or container is in the removal position.

18 Claims, 3 Drawing Sheets

(51) Int. Cl.
*B25J 9/16* (2006.01)
*B65G 1/04* (2006.01)

(52) U.S. Cl.
CPC ......... *B65G 1/1371* (2013.01); *B65G 1/1378* (2013.01); *G06Q 10/08* (2013.01); *G06Q 10/087* (2013.01); *B65G 2201/02* (2013.01); *B65G 2203/041* (2013.01); *G05B 2219/39543* (2013.01); *G05B 2219/40554* (2013.01)

Fig. 6

PICKING SYSTEM

CROSS-REFERENCE TO RELATED APPLICATION

The present application is a U.S. National Phase of International Patent Application Serial No. PCT/EP2016/001347 entitled "ORDER-PICKING SYSTEM" filed on Aug. 4, 2016. The entire contents of the above-mentioned application are hereby incorporated by reference in their entirety for all purposes.

TECHNICAL FIELD

The present invention relates to a picking system for the order-related picking of goods, comprising an automated picking cell that includes a gripper for gripping and picking the goods and a cell control unit for actuating the gripper.

BACKGROUND AND SUMMARY

First attempts have been made already to use such a picking system for picking goods that are stored in a rack. However, grippers usually have considerable problems in safely removing goods from a rack. When the goods are stored in containers in the rack, the removal is even more difficult for a gripper due to the interfering edges formed by the rack.

Therefore, it is the object of the present invention to provide a picking system for the order-related picking of goods stockpiled in racks.

This object is achieved by a picking system as described further herein. Preferred embodiments of the present invention are also described further herein.

The present invention comprises a picking system for the order-related picking of goods stockpiled in racks, with an automated picking cell that includes a gripper for gripping and picking the goods and a cell control unit for actuating the gripper, and with a transport system by which the racks can be conveyed to at least one picking position in the vicinity of the picking cell, wherein the racks include shelves and/or containers on and/or in which goods are stockpiled. The picking system according to the invention is characterized in that at least one shelf and/or container of a rack arranged in the picking position can be conveyed from a storage position within the rack into a removal position in which it is at least partly arranged in front of the rack, wherein the gripper is actuated by the cell control unit such that it grips the goods stockpiled on the shelf and/or in the container, while in the removal position the shelf and/or container is at least partly arranged in front of the rack. Problems usually existing when gripping from a rack thereby can be avoided.

The picking system according to the invention preferable includes at least one object detection device for detecting the goods stockpiled on the shelf and/or in the container.

In a possible embodiment it is provided that the object detection device is arranged and/or can be arranged such that the detection is made while the shelf and/or container are in the removal position.

Furthermore, it can be provided that the object detection device is arranged and/or can be arranged in a position above the shelf and/or container arranged in the removal position.

In a possible embodiment it is provided that the cell control unit evaluates the data of the object detection device and actuates the gripper on the basis of a path planning.

Preferably, the object detection device forms part of the picking cell.

In a possible embodiment it is provided that the object detection device is traversable.

The object detection device preferably can be traversable in the lateral direction and/or in the height direction along a rack disposed in a picking position, in order to be arranged above one of a plurality of shelves and/or containers of the rack arranged one beside and/or on top of the other, the goods of which rack are to be picked.

In a possible embodiment it is provided that by actuating the transport system the rack is conveyed into one of a plurality of picking positions in dependence on the position of the shelf and/or container whose goods are to be picked. In particular, this can be effected in dependence on the position of the shelf and/or container within the rack. The picking position preferably can be chosen such that the shelf and/or container whose goods are to be picked is arranged in a specified position relative to the picking cell and/or to the object detection device.

Furthermore, the picking system can include an order management control unit for processing a plurality of picking orders by actuating the transport system and the picking cell.

Preferably, it is provided that the order management control unit actuates the transport system in dependence on the order to be processed such that at least one rack is traversed into the picking position, in which rack a product to be picked for the order is stockpiled, and/or that the order management control unit actuates the picking system and/or the cell control unit such that the shelf and/or container of the rack, on and/or in which the product to be picked for the order is stockpiled, is moved from the storage position into the removal position.

Furthermore, the picking system can comprise at least one actuator for moving the shelf and/or container from the storage position into the removal position and/or from the removal position into the storage position. Preferably, the actuator is actuated by the order management control unit and/or cell control unit.

In a possible embodiment it is provided that the actuator that moves the shelf and/or container is formed by the gripper, which is actuated by the cell control unit such that it moves the shelf and/or container from the storage position into the removal position and/or that it moves the shelf and/or container from the removal position into the storage position.

In another possible embodiment it is provided that the actuator is arranged on the rack. The actuator or actuators by which the shelves and/or containers are movable hence forms or form part of the respective rack. In particular, each of the racks includes at least one such actuator.

Preferably, each shelf and/or container of the rack is movable by an actuator of the rack from the storage position into the removal position and/or from the removal position into the storage position.

In a possible embodiment it is provided that each shelf and/or container of the rack has its own actuator. For example, this can be a motor by which the shelf is movable and/or a slide by which a container can be pushed out of the rack and/or into the rack.

Furthermore, it can be provided that the rack includes an electric energy storage device that supplies the actuator or actuators with energy. The electric energy storage device in particular can be a battery and/or an accumulator.

Alternatively or in addition, in the picking position the rack can be connectable to an energy supply unit in order to supply the actuator or actuators with energy. Furthermore, it can be provided that in the picking position the rack preferably is connectable to the cell control unit and/or order management control unit in order to actuate the actuator or actuators.

Preferably, the connection for energy supply and/or control purposes is effected wirelessly and/or by means of a galvanic connection.

In another possible embodiment it is provided that the actuator forms part of the picking cell. This has the advantage that the racks require no or fewer actuators. The actuator preferably is arranged in the vicinity of the picking cell such that it is usable for moving at least one shelf and/or container of a rack that is in a picking position.

Preferably, the actuator is usable for moving a plurality of shelves and/or containers of the rack.

In a possible embodiment it is provided that the actuator is arranged on a traversable holder in order to arrange the actuator in an engagement position relative to one of the shelves and/or containers, in which it can move this shelf and/or container.

Preferably, the holder is traversable in the lateral direction and/or height direction in order to arrange the actuator in an engagement position relative to one of a plurality of shelves and/or containers of the rack arranged one beside and/or on top of the other.

Alternatively or in addition it can be provided that a plurality of actuators is provided, which each are associated with at least one of a plurality of shelves and/or containers arranged one on top of and/or beside the other.

Preferably, the traversing movement of the holder is actuated by the order management control unit and/or cell control unit.

In a possible embodiment the actuator is arranged on the side of the rack facing away from the gripper and can at least move the shelf and/or container from the storage position into the removal position.

Alternatively, the actuator is arranged on the side of the rack facing the gripper and can at least move the shelf and/or container from the removal position into the storage position.

In a possible embodiment at least one first actuator is arranged on the side of the rack facing away from the gripper and can move the shelf and/or container from the storage position into the removal position, and at least one second actuator is arranged on the side of the rack facing the gripper and can shift the shelf and/or container from the removal position into the storage position.

In a possible embodiment the actuator can move the shelf and/or container from the storage position into the removal position and back. The actuator can be arranged on the side of the rack facing away from the gripper or facing the gripper.

In a possible embodiment the actuator includes a coupling mechanism for coupling to the shelf and/or container, by means of which it can exert a tensile force on the shelf and/or container. This preferably is the case when only one actuator is used for moving in both directions.

In a possible embodiment the actuator is a slide by which the shelf and/or container is shiftable from the removal position into the storage position and/or from the storage position into the removal position. In particular, the slide can have a contact surface with which it is moved against a contact surface of the shelf and/or container in order to move the same.

The actuator can be a linear actuator or comprise a linear actuator. In possible embodiment it is provided that the linear actuator has a horizontal direction of movement.

In a possible embodiment the shelf and/or container is supported by the rack both in the storage position and in the removal position. For example, the shelf and/or container can be shiftably connected to the rack via rollers and/or rails.

Alternatively, in the removal position the shelf and/or container no longer is supported by the rack and/or no longer is in contact with the rack.

In a possible embodiment the picking system can employ containers which in the storage position are placed on a fixed shelf of the rack and are moved relative to the shelf into the removal position. The containers might no more be connected to the rack.

Preferably, the rack includes compartments that are at least open towards the side of the gripper so that the containers slipping on the shelf are shiftable out of the rack. More preferably, the compartments are also open on the side facing away from the gripper so that an actuator can be used for moving the containers from this side into the rack.

The picking system according to the invention preferably includes a deposition element for supporting a shelf and/or container disposed in the removal position. This has the advantage that in the removal position the shelf and/or container no longer must be supported by the rack and in a possible embodiment can completely be moved out of the rack and/or no longer must be in contact with the rack.

This is advantageous in particular when the system employs containers which in the storage position are placed on a fixed shelf of the rack and are moved relative to the shelf into the removal position. Preferably, the container is moved, in particular pushed and/or pulled, from the shelf onto the deposition element arranged in front of the rack, wherein a deposition area of the deposition element therefor preferably is arranged at the same height as the shelf.

Preferably, the deposition element is part of the picking cell. The deposition element preferably is arranged in the vicinity of the picking cell such that a shelf and/or container of a rack that is disposed in a picking position is movable from the storage position within the rack onto the deposition element in order to remove goods from and/or out of the shelf and/or container.

In a possible embodiment the deposition element can include an actuator by means of which the shelf and/or container at least is movable from the removal position into the storage position. In particular, the actuator preferably can be a slide by means of which the shelf and/or container is shiftable from the removal position into the storage position.

In a possible embodiment it is provided that by means of the actuator arranged on the deposition element the shelf and/or container also is movable from the storage position within the rack onto the deposition element. Alternatively a further actuator can be provided, by means of which the shelf and/or container is movable from the storage position within the rack onto the deposition element.

In a possible embodiment the deposition element can be usable for supporting a plurality of shelves and/or containers of the rack. Preferably, the deposition element is traversable in order to be brought into a depositing position relative to one of the plurality of shelves and/or containers, in which the shelf and/or container is movable onto the deposition element.

Preferably, the deposition element is traversable in the height direction and/or lateral direction in order to be brought into a depositing position relative to one of a plurality of shelves and/or containers of the rack arranged one top of and/or beside the other.

Furthermore, a plurality of deposition elements can be provided, which each are associated with at least one of a plurality of shelves and/or containers arranged one beside the other. In a possible embodiment it is provided that the deposition elements are vertically traversable independent of each other.

Furthermore, it can be provided that the traversing movement of the deposition element is actuated by the order management control unit and/or cell control unit.

Furthermore, it can be provided that an object detection device is connected to the deposition element and preferably is arranged above the deposition element and/or traversable with the same.

The object detection device can however also be arranged on the gripper and/or gripper arm, in particular on the robot arm or on the area gantry.

The object detection device can also be arranged on a holding element, in particular on a holding element independent of the movement of the deposition element and/or gripper arm. The holding element can include a traversing assembly for traversing the object detection device.

In a possible embodiment it is provided that at least two racks at the same time can be arranged in one picking position each in the vicinity of the picking cell so that the gripper each can remove goods from the racks.

Preferably, the order management control unit actuates the transport system in dependence on the order to be processed such that it moves a second rack, in which the next product to be picked is stored, into a second picking position, while a product from a first rack disposed in a first picking position is picked. More preferably, the corresponding shelf and/or container of the second rack is moved from the storage position into the removal position, while the product from the first rack is picked and/or while the gripper moves in the direction of the second picking position.

The picking system according to the invention preferably is designed such that the goods to be picked are deposited by the gripper in one or more order containers automatically and based on an order.

The picking system furthermore can include a conveying system for supplying and/or discharging order containers into the region of the picking cell. In a possible embodiment it is provided that the goods to be picked are deposited in the order containers based on an order. Furthermore, it can be provided that the conveying system conveys the order containers from the picking cell to a shipping section.

In a possible embodiment it is provided that the picking cell includes a gripper arm on which the gripper is arranged and by means of which the gripper is movable. As a gripper arm, the picking cell in particular can include at least one 6-axes robot on which the gripper is arranged. Alternatively, the picking cell can include at least one area gantry on which the gripper is arranged, wherein the gripper preferably is arranged on the area gantry via one or more rotatory axes.

In a possible alternative embodiment the gripper can be arranged on a gripping arm or gantry with fewer axes, e.g. on a 2-axes arm, 3-axes arm, 4-axes arm or 5-axes arm or a linear gantry. Preferably, one or more axes of movement of the deposition element are used in this case in order to arrange the goods in a position suitable for gripping.

The object detection device can comprise a camera and/or a laser scanner.

In a possible embodiment it is provided that the cell control unit actuates the gripper such that the goods are deposited in an order container at a predetermined position and/or with a predetermined orientation.

The picking system can include an object detection device for detecting the goods in the order container. In a possible embodiment, this object detection device can be the same object detection device that is also used for detecting the goods on the shelf and/or in the container of the rack. Preferably, however, this is a second object detection device. The object detection device preferably is arranged and/or can be arranged above the order container.

The present invention furthermore comprises a picking cell for a picking system as it has been described above.

Furthermore, the present invention comprises an order management control unit and/or cell control unit or software for an order management control unit and/or cell control unit for a picking system as it has been described above.

The present invention furthermore comprises a picking method for the order-related picking of goods stockpiled in racks by means of a picking system, wherein the picking system includes an automated picking cell that includes a gripper for gripping and picking the goods and a cell control unit for actuating the gripper, and a transport system by which the racks can be conveyed to at least one picking position in the vicinity of the picking cell, wherein the racks include shelves and/or containers on and/or in which goods are stockpiled. It is provided that at least one shelf and/or container of a rack arranged in the picking position is conveyed from a storage position within the rack into a removal position in which it is at least partly arranged in front of the rack, wherein the gripper grips the goods stockpiled on the shelf and/or in the container, while in the removal position the shelf and/container is at least partly arranged in front of the rack.

The method preferably is effected such as has already been described above in detail with respect to the picking system according to the invention. In particular, the method is effected by using a picking system as it has been described above.

BRIEF DESCRIPTION OF THE FIGURES

The present invention will now be described in detail with reference to exemplary embodiments and drawings.

In the drawings.

DETAILED DESCRIPTION

The present invention comprises a picking cell, a picking system and a picking method for picking goods stored in racks 4, wherein the goods in particular can be articles of daily use and/or industrial goods.

The picking cell and/or the picking system usually form part of a material flow system. The material flow system furthermore can comprise a storage system formed by a plurality of racks, a shipping section and/or conveying systems.

The picking system and/or the picking cell preferably is designed for handling goods of different size, different shape and/or design and/or with a different packaging, and therefore allows an individual handling of the goods.

Figure 1:
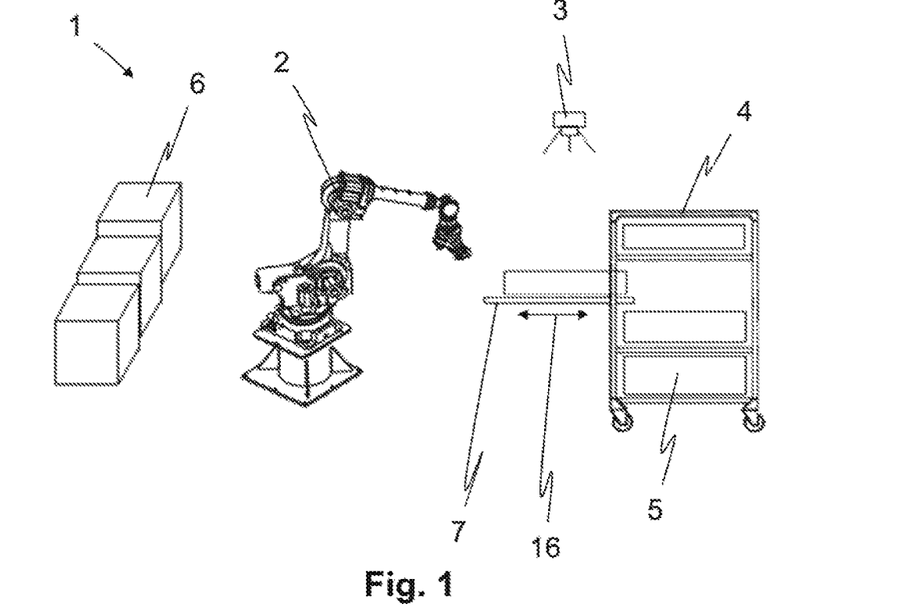
FIG. 1: shows a first exemplary embodiment of a picking system according to the invention, in which the shelves of the racks can be pulled out of the racks.

The first exemplary embodiment of a picking system as shown in FIG. 1 shows a picking cell 1 that comprises a picking robot 2 with a gripper arranged on a gripper arm. In the exemplary embodiment, the gripper arm is the robot arm of a 6-axes robot. Alternatively, the gripper and/or gripper arm might be arranged on an area gantry. Depending on the field of use of a picking cell according to the invention, the picking robot 2 is equipped with at least one gripper in order to comply with the corresponding gripping requirements of the use. Suitable grippers include for example a suction gripper, a mechanical gripper such as a 2- or 3-finger gripper, etc.

Furthermore, the picking system includes an object detection device 3 that detects at least the position and/or orientation of the goods to be picked. Preferably, the object detection device is designed such that a reliable object recognition is effected in addition, by means of which the respective product can be identified. This can be effected on the basis of the shape, a barcode, a logo, a surface structure. The object detection device 3 preferably is part of the picking cell.

The object detection unit can comprise a camera unit. In particular, the object detection unit can comprise a 2D camera and/or a 3D camera. The use of a plurality of camera units, in particular a combination of a 2D and 3D camera, also is conceivable. Furthermore, the object detection unit can comprise a laser scanner. In particular, the use of a laser triangulation is conceivable.

The picking cell furthermore comprises a non-illustrated cell control unit that communicates with the object detection device 3 and the picking robot 2 via data transmission routes, and from the data supplied by the object detection device determines the position and/or orientation of the detected goods, gripping positions and gripping paths and actuates the robot for gripping and depositing goods. In particular, the cell control unit prompts the picking robot to effect the order-oriented picking of the goods, in particular in order containers 6. This allows an automation of the handover of the goods into order containers 6. Therefore, an operator no longer is needed for picking purposes. The picking cell can include an object detection device for detecting the goods deposited in an order container 6. This provides for monitoring the correct arrangement of the goods in the order containers 6. The object detection device preferably is arranged above an output station in which the output containers are arranged for depositing goods.

The picking system according to the invention furthermore comprises a non-illustrated transport system by means of which racks 4 can be conveyed from a non-illustrated storage system into at least one picking position in the vicinity of the picking cell. Preferably, this is a driverless transport system that is automatically actuated by an order management control unit. The advantage of the use of an automated picking cell for the removal of the goods stored in a rack as compared to manual picking methods in particular consists in that the height of the rack can be increased, as the same is not limited by the body size of a person.

Preferably, the goods are stored in containers 5 that are arranged in the racks and preferably stand on shelves 7 of the racks 4. The containers 5 either can comprise only one type of article or different types of article, for example for containers pre-picked already. In a possible embodiment of the present invention the goods to be picked can, however, also be stored directly on the shelves 7. The removal of the goods from the containers or from the shelves within the rack is not possible by means of known robots, as for reasons of collision with the rack the space is not sufficient for the robot to grip the goods.

To overcome these problems, the picking system according to the invention is designed such that the shelves 7 and/or the containers 5 arranged on the same of the rack 4 arranged in the picking position can be moved from a storage position within the rack into a removal position. In this removal position shown for example in FIG. 1 for the shelf 7 and the container arranged thereon the shelf or container is at least partly arranged in front of the rack. The gripper thereby has free access to the goods arranged on the shelf and/or in the container from above. The present invention hence provides for gripping of the goods by the gripper, as considerably less interfering edges are present. Furthermore, the object detection is simplified considerably, as the same likewise can easily be effected from above. In possible embodiments of the present invention the shelf and/or the container in the removal position can also be arranged completely outside the rack.

FIGS. 1 to 6 show six different exemplary embodiments of such a picking system according to the invention.

In all exemplary embodiments the object detection device 3 is arranged in the vicinity of the picking cell such that it is arranged or can be arranged above a shelf and/or container that is disposed in the removal position. The object detection device 3 can be traversable. Traversing the object detection device 3 for example can be effected in an automated way in order to be arranged above a shelf and/or container depending on which shelf and/or container of a plurality of shelves and/or containers arranged one beside the other is moved into the removal position. Alternatively or in addition it would also be conceivable to arrange the shelves in the vicinity of the picking cell such that the shelf and/or container that is to be moved out of the rack for picking purposes is disposed in its removal position below the object detection device 3. Furthermore, the object detection device 3 possibly can be traversable in the height direction in order to each be arranged at a specified distance above the container and/or shelf that is disposed in the removal position.

The object detection device can be arranged for example on a separate holding element that preferably includes a traversing assembly for traversing the object detection device. Alternatively, the object detection device can be arranged on the robot arm or area gantry and thus be moved with the gripper. Furthermore, the object detection device, as will yet be described in detail below, can be arranged on a deposition element of the picking cell.

In the exemplary embodiment shown in FIG. 1 the racks 4 include extendable shelves 7. The shelves preferably are connected to the rack such that even in the removal position they are still held by the rack. For example, the shelves can be attached to the rack on rollers or rails and then be pulled out manually or by means of an actuator.

The shelves can be conveyed out of the rack for example mechanically by pulling and/or pushing. For example, it is conceivable that the gripper is used to pull the shelf out of the rack and/or again push it into the same. Alternatively, it is conceivable that the rack includes one or more actuators via which the shelves are moved. Preferably, the same are connected to an order management system that actuates the actuator or actuators such that depending on the picking order the corresponding shelf is automatically moved out of the rack so that a removal of the respectively desired product becomes possible.

In the embodiment shown in FIG. 1 the goods are stored in containers 5 that are arranged on the shelves 7 and therefore can be moved out of the racks together with the shelves. Alternatively, in this embodiment the goods might also be stored directly on the shelf. The shelves might also be designed as drawers.

The exemplary embodiments shown in FIGS. 2 to 6 on the other hand show a picking system in which not the shelves, but the containers 5 standing on the shelves are pushed out of the rack. Therefore, the exemplary embodiments each provide a deposition element 8 that is arranged on the side of the gripper in front of the rack and onto which a container can be pushed out of the rack. In the removal position the respective container therefore is at least partly and preferably completely standing on the deposition element 8. After the removal of the product, the container can again be pushed back into the rack from the deposition element 8.

The deposition element 8 is height-adjustable via a lifting mechanism 16 so that depending on the order the deposition area of the deposition element each can be arranged at a height that allows to push the container from which a product is to be removed next from the rack onto the deposition element. The deposition element is part of the picking cell and is actuated by the cell control unit and/or the order management system such that the deposition area each has the correct height for the next container.

Figure 5:
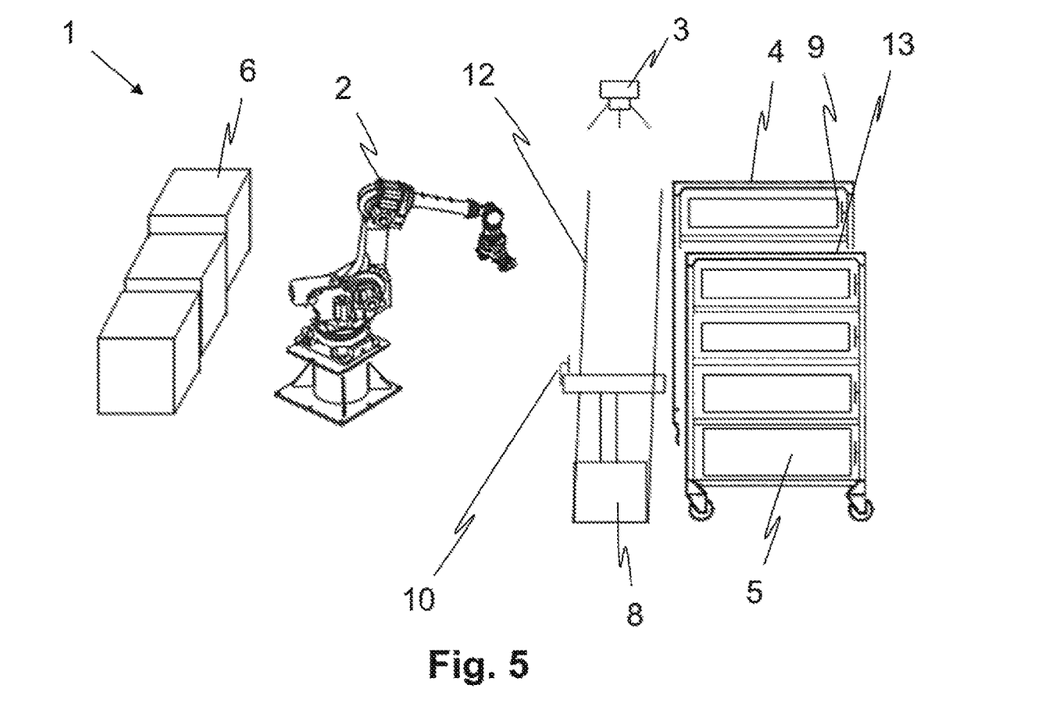
FIG. 5: shows another exemplary embodiment of a picking system according to the invention, which is based on the exemplary embodiment shown in FIG. 2 and in which a plurality of racks can be arranged one beside the other in the vicinity of the picking cell.
Figure 6:
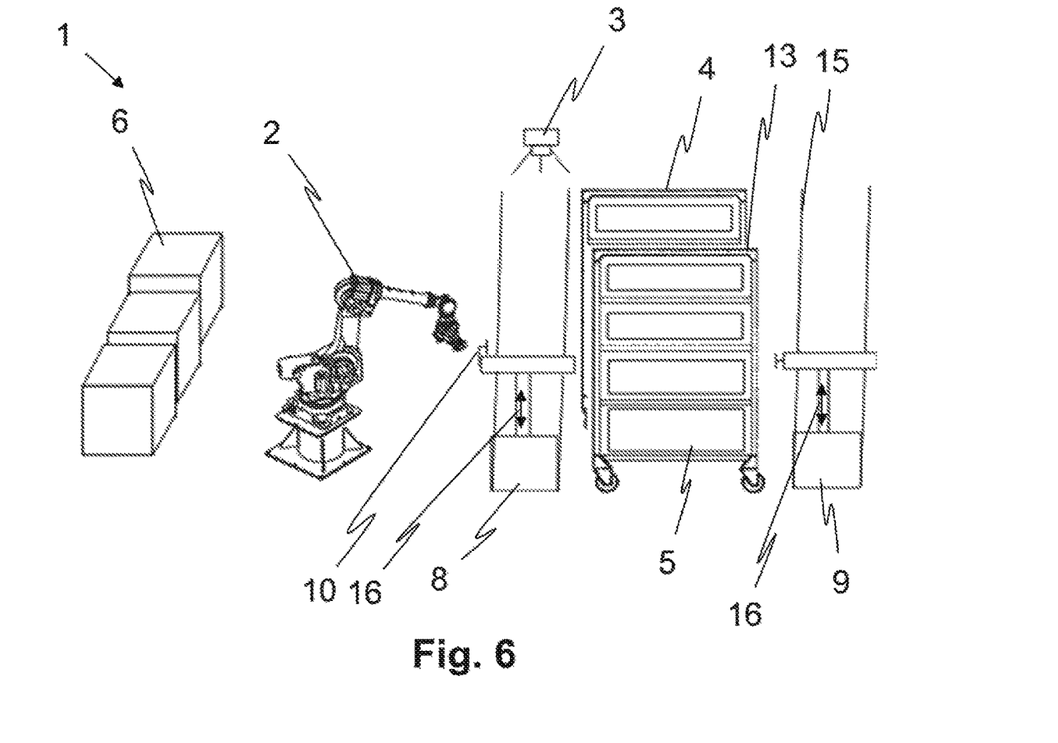
FIG. 6: shows another exemplary embodiment of a picking system according to the invention, which is based on the exemplary embodiment shown in FIG. 3 and in which a plurality of racks can be arranged one beside the other in the vicinity of the picking cell.

In possible embodiments, which are schematically shown in FIGS. 5 and 6, the deposition element 8 can also be laterally shiftable. On the one hand, this can serve to be traversed between two racks and/or along a rack. For example, it is conceivable that in dependence on the container which each is to be pushed out of the rack the deposition element is positioned in front of one or more racks in one of a plurality of positions arranged laterally one beside the other. Furthermore, it is conceivable that the containers on the deposition element are traversed into one and/or more fixed removal positions, after they have been pushed out of the rack. In particular, the containers can be moved into a position relative to the gripper, in which it is easier for the gripper to remove the goods. In conceivable embodiments of the present invention the axes of movement of the deposition element also can be utilized to position a product arranged within the container relative to the gripper. The number of the axes of movement of the gripper thereby can be reduced.

The exemplary embodiments of FIGS. 2 to 4 described in detail below in particular differ in the way in which the containers are moved out of the rack into the removal position, i.e. onto the deposition element 8, and back again. The same solutions might, however, also be used for moving shelves, as they are known from FIG. 1.

Figure 2:
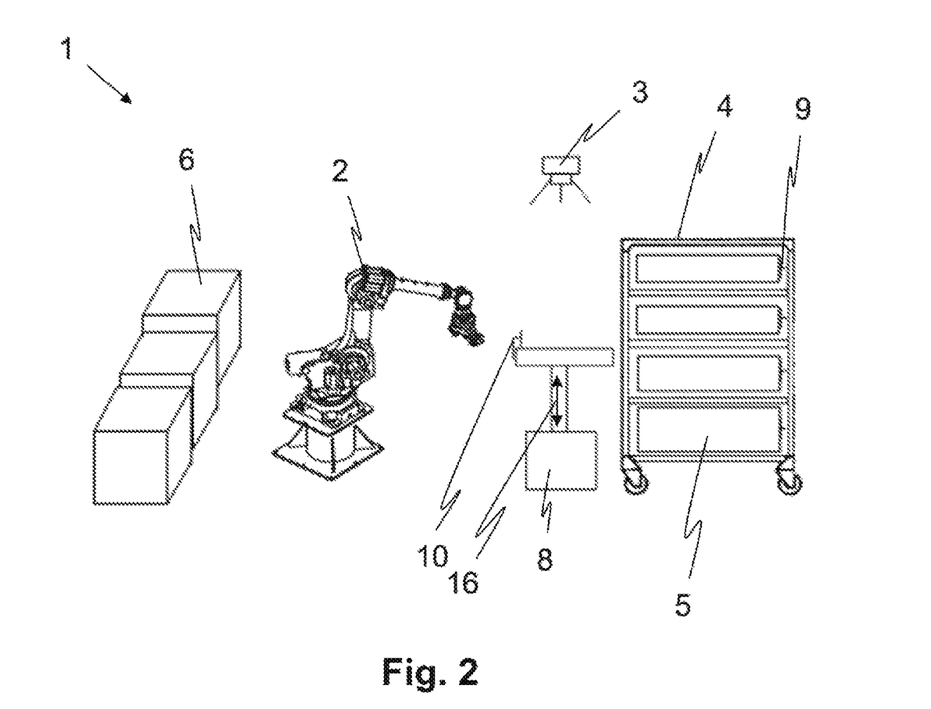
FIG. 2: shows a second exemplary embodiment of a picking system according to the invention, in which containers can be pushed out of the racks via actuators that are arranged in the racks, and in which a deposition element is provided for the containers pushed out of the racks.

In the exemplary embodiment shown in FIG. 2 the rack itself each includes one or more actuators 9 via which the containers can be pushed out of the rack. In particular, this can be slides 9 that are part of the rack 4. With each container and/or shelf a separate slide can be associated. Preferably, the actuators are in communication with the order management control unit so that depending on the order the right container is pushed out of the rack. In the picking position, the racks can be connected to an energy supply system via an energy connection, which supplies the actuators with energy. The energy transmission can also be effected wirelessly, just like the communication with the order management system. Alternatively or in addition, the racks can include an electric energy storage device such as a battery and/or an accumulator which supplies the actuators with energy.

In the exemplary embodiment shown in FIG. 2, pushing the containers back into the rack is effected via a further actuator 10 that is arranged on the height-adjustable part of the deposition element 8 and therefore is adjusted in height along with the same. The actuator 10 thereby each is in the right position for moving the container. Preferably, this also is a slide here.

As an alternative to the embodiment shown in FIG. 2, it would also be conceivable that the robot is actuated such that it pulls the container out of the rack and/or again pushes the container into the rack.

Figure 3:
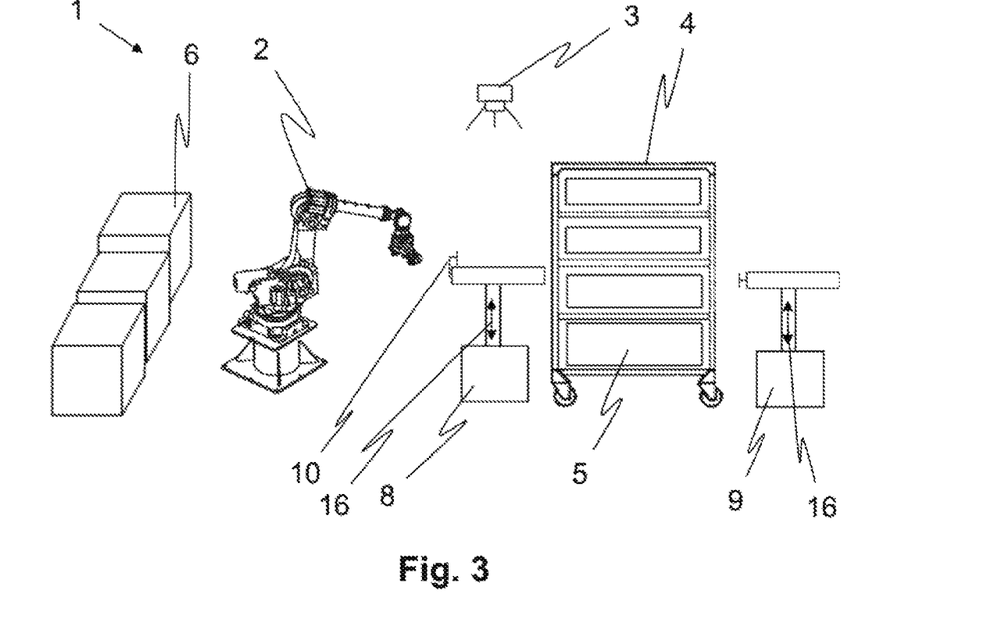
FIG. 3: shows another exemplary embodiment of a picking system according to the invention, in which the containers can be pushed out of the rack via an actuator of the picking cell.

FIG. 3 shows an exemplary embodiment in which an actuator belonging to the picking cell is arranged on the back of the rack in order to push the containers to be picked out of the rack. The actuator is attached to a holder 9 and height-adjustable via a mechanism 16 so as to be each arranged at the proper height. The height adjustment of the holder of the actuator preferably is effected in parallel and more preferably in synchronism with the height adjustment of the deposition element 8. Alternatively or in addition it would be conceivable to form a plurality of actuators at different levels as part of the cell.

In the exemplary embodiment shown in FIG. 3 a slide in turn is used as an actuator.

Pushing the containers back into the rack is effected like in the exemplary embodiment shown in FIG. 2, i.e. via an actuator 10 that is arranged on the deposition element 8.

As in the exemplary embodiment shown in FIG. 3 all actuators are configured for moving the containers as parts of the picking cell, the racks 4 can be designed conventionally. The compartments of the racks preferably are open towards the front and towards the rear so that the containers can be pushed out of the rack towards the front and be pushed back into the same, and the actuators arranged outside the rack have access to the containers from the rear.

Figure 4:
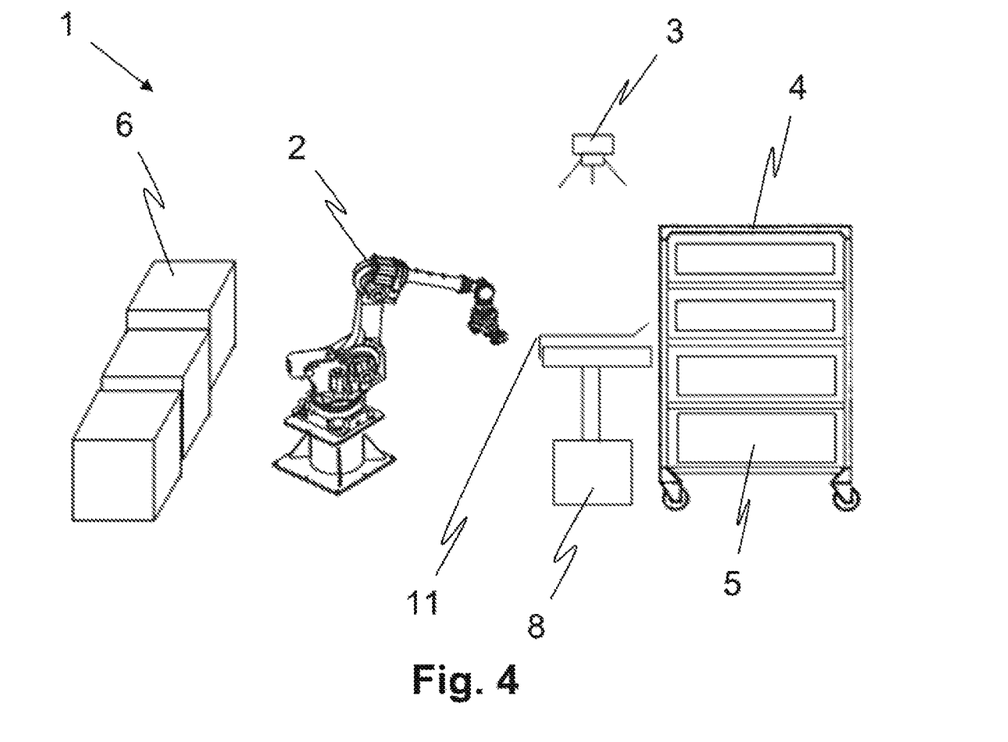
FIG. 4: shows another exemplary embodiment of a picking system according to the invention, in which the same actuator serves for pulling out and for pushing in the containers, wherein the actuator is part of the picking cell and is arranged on a deposition element.

In the exemplary embodiment shown in FIG. 4 other than in the exemplary embodiment of FIG. 3 two separate actuators arranged on different sides of the rack no longer are used for pushing out and pushing in the containers, but a multifunctional actuator that is usable both for moving the containers out of the rack and for moving the same into the rack.

In the exemplary embodiment shown in FIG. 4 this multifunctional actuator is arranged on the deposition element 8 and therefore is height-adjusted together with the same. The actuator can both pull the containers out of the rack and again push the same into the rack. Preferably, it therefor includes a corresponding element for coupling to the containers.

As an alternative to the embodiment shown in FIG. 4 such a multifunctional actuator might also be arranged on a holder 9 as it is shown in FIG. 3. Then, an actuator in the vicinity of the support element 8 might be omitted.

In the embodiments described so far the gripper and the object detection system 3 must be able to compensate differences in height, due to the different height of the shelves and/or containers relative to the rack, and yet ensure an optimum removal of the goods.

In a possible embodiment of the present invention the height adjustability of the deposition element might, however, also be utilized to traverse the container in one or more defined removal height positions for detecting and removing the goods, after it has been moved onto the deposition element.

Alternatively or in addition, the object detection device 3 likewise might be attached to the deposition element 8 and be height-adjusted together with the same so that the object detection device has a defined height relative to a container resting on the support element.

In the embodiments shown so far the picking cell is designed such that only one rack can be arranged in a picking position relative to the gripper. The present invention is, however, not limited to such embodiments. Rather, all of the previously illustrated exemplary embodiments can also be used when a plurality of racks can be arranged in the vicinity of the picking cell at the same time in different picking positions.

In FIGS. 5 and 6 two such exemplary embodiments are shown, in which by means of the transport system at least two racks can be arranged one beside the other in the vicinity of the picking cell. This offers the advantage that for reasons of cycle time the shelves or containers can be moved out of the rack into a removal position, be detected by the object detection system and be provided for removal, while a product still is removed from another rack and/or deposited in an order container, or while the gripper moves towards the rack. The rack prepared in this way or the container prepared in this way can be picked faster by the robot.

The exemplary embodiment shown in FIG. 5 otherwise corresponds to the exemplary embodiment shown in FIG. 2, the exemplary embodiment shown in FIG. 6 otherwise corresponds to the exemplary embodiment shown in FIG. 3, so that reference is made to the above description.

In the exemplary embodiments shown in FIGS. 5 and 6 the deposition element 8 or the holder 9 for the slide each include a possibility for horizontal traversal, which for example is realized as a traversing rail and via which they are traversable from one rack to another rack. This has the advantage that the racks do not require a separate apparatus.

However, for reasons of cycle time optimization it can be advantageous that the racks each include separate deposition elements and/or slides. Preferably, in particular at least two deposition elements are provided so that the first deposition element provides for the removal and the second one already prepares the next container to be picked, in order to reduce the cycle time.

In the exemplary embodiments shown in FIGS. 5 and 6 two racks 4 and 13 are shown, which can be arranged in the vicinity of the picking cell. What is also conceivable, however, are embodiments in which even more racks can be arranged in the vicinity of the picking cell at the same time.

In a preferred embodiment of the picking cell according to the invention, the same allows a deposition of goods in the order containers 6 at the exact position. A compliant and precise filling of the order containers thereby is possible. In a possible embodiment the order containers can directly get into the shipping section.

The compliant and precise filling of the order containers can be effected by means of a database in which geometry data of the goods to be picked and/or geometry data of the used order containers are stored. On the basis of these data an exact filling of the respective order container becomes possible. In particular, for processing an order the position and/or orientation of the goods that are to be deposited in an order container is calculated. These data then are forwarded to the control unit of the picking robot 2 that deposits the goods in the corresponding position and/or orientation.

The object detection device 3 and the cell control unit preferably are designed such that the goods can be provided in the racks and/or in containers 5 arranged in the racks unsorted.

The invention claimed is:

1. A picking system for the order-related picking of goods stockpiled in racks, comprising:
    an automated picking cell that includes a gripper for gripping and picking the goods and a cell control unit for actuating the gripper,
    racks including shelves and/or containers on and/or in which goods are stockpiled,
    a transport system by which the racks can be conveyed to at least one picking position in a vicinity of the picking cell, and
    an order management control unit for processing a plurality of picking orders by actuating the transport system and the automated picking cell,
    wherein at least one shelf and/or container of a rack arranged in the picking position can be conveyed from a storage position within the rack into a removal position in which the at least one shelf and/or container is at least partly arranged in front of the rack, the picking system comprising at least one actuator for moving the shelf and/or the container of the at least one rack from the storage position into the removal position and/or from the removal position into the storage position, the at least one actuator being controlled by the order management control unit and/or the cell control unit,
    wherein the at least one actuator forms part of the automated picking cell, wherein the at least one actuator is usable for moving a plurality of shelves and/or containers of the at least one rack, wherein the at least one actuator is arranged on a traversable holder in order to arrange the at least one actuator in an engagement position relative to one shelf and/or container of the plurality of shelves and/or containers, in which the at least one actuator can move the one shelf and/or container, wherein the traversable holder is traversable in a lateral direction and/or height direction in order to arrange the at least one actuator in an engagement position relative to one of a plurality of shelves and/or containers of the at least one rack arranged one beside and/or on top of the other, and
    wherein the cell control unit actuates the gripper to grip the goods stockpiled on and/or in the at least one shelf and/or container, while the at least one shelf and/or container in the removal position is at least partly arranged in front of the rack.

2. The picking system according to claim 1, further comprising at least one object detection device for detecting the goods stockpiled on and/or in the at least one shelf and/or container, wherein the at least one object detection device is arranged to detect the goods while the at least one shelf and/or container is disposed in the removal position, wherein the at least one object detection device is arranged in a position above the at least one shelf and/or container arranged in the removal position.

3. The picking system according to claim 2, wherein the cell control unit evaluates data of the at least one object detection device and actuates the gripper on a basis of a path planning, and/or wherein the at least one object detection device forms part of the automated picking cell.

4. The picking system according to claim 2, wherein the object detection device is traversable, wherein the object detection device is traversable in a lateral direction and/or in a height direction along a rack disposed in a picking position, and controlled to be arranged above one of a plurality of shelves and/or containers of the rack from which the goods are to be picked.

5. The picking system according to claim 1, wherein by actuating the transport system the rack is conveyed into one of a plurality of picking positions in dependence on the position of the shelf and/or container whose goods are to be picked, wherein the picking position is chosen such that the shelf and/or container whose goods are to be picked is arranged in a specified position relative to the automated picking cell and/or to the object detection device.

6. The picking system according to claim 1, wherein the order management control unit actuates the transport system in dependence on an order to be processed such that at least one rack is traversed into the picking position, a product to be picked for the order stockpiled in the at least one rack, and/or wherein the order management control unit actuates the picking system and/or the cell control unit such that a shelf and/or a container of the at least one rack, on and/or in which the product to be picked for the order is stockpiled, is moved from the storage position into the removal position.

7. The picking system according to claim 1, wherein the at least one actuator is arranged on a side of the at least one rack facing away from the gripper and can at least move the shelf and/or the container from the storage position into the removal position, and/or wherein the at least one actuator is arranged on a side of the at least one rack facing the gripper and can at least move the shelf and/or the container from the removal position into the storage position, wherein at least one first actuator is arranged on the side of the rack facing away from the gripper and can move the shelf and/or the container from the storage position into the removal position, and at least one second actuator is arranged on the side of the rack facing the gripper, which can shift the shelf and/or the container from the removal position into the storage position.

8. The picking system according to claim 1, further comprising a deposition element for supporting a shelf and/or container disposed in the removal position, wherein the deposition element preferably is part of the automated picking cell and a shelf and/or container is movable from the storage position within the rack onto the deposition element in order to remove goods from and/or out of the shelf and/or the container, wherein the deposition element is usable for supporting a plurality of shelves and/or containers of the rack, wherein the deposition element is traversable in order to be arranged in a depositing position relative to one of the plurality of shelves and/or containers, in which the shelf and/or the container is movable onto the deposition element.

9. The picking system according to claim 1, wherein at least two racks at the same time can be arranged in one picking position each in the vicinity of the automated picking cell so that the gripper can remove goods from each of the at least two racks, wherein an order management control unit actuates the transport system in dependence on an order to be processed such that it moves a second rack, in which a next product to be picked is stored, into a second picking position, while a product from a first rack disposed in a first picking position is picked, wherein a corresponding shelf and/or container of the second rack is moved from the storage position into the removal position, while the product from the first rack is picked and/or while the gripper moves in a direction of the second picking position.

10. The picking system according to claim 1, further comprising a conveying system for supplying and/or discharging order containers into and from a region of the automated picking cell, wherein goods to be picked are deposited in the order containers based on an order, wherein the conveying system conveys the order containers from the automated picking cell to a shipping section.

11. The picking system according to claim 1, wherein the automated picking cell includes at least one 6-axes robot on which the gripper is arranged, and/or wherein the automated picking cell includes at least one area gantry on which the gripper is arranged.

12. The picking system according to claim 1, wherein the cell control unit actuates the gripper such that the goods are deposited in an order container at a predetermined position and/or with a predetermined orientation.

13. A picking system for the order-related picking of goods stockpiled in racks, comprising:
   an automated picking cell that includes a gripper for gripping and picking the goods and a cell control unit for actuating the gripper,
   racks including shelves and/or containers on and/or in which goods are stockpiled,
   a transport system by which the racks can be conveyed to at least one picking position in a vicinity of the picking cell, and
   an order management control unit for processing a plurality of picking orders by actuating the transport system and the automated picking cell,
   wherein at least one shelf and/or container of a rack arranged in the picking position can be conveyed from a storage position within the rack into a removal position in which the at least one shelf and/or container is at least partly arranged in front of the rack, the picking system comprising at least one actuator for moving the shelf and/or the container of the at least one rack from the storage position into the removal position and/or from the removal position into the storage position, the at least one actuator being controlled by the order management control unit and/or the cell control unit,
   wherein the at least one actuator that moves the shelf and/or the container of the at least one rack is formed by the gripper, which is actuated by the cell control unit such that the at least one actuator moves the shelf and/or the container of the at least one rack from the storage position into the removal position and/or that the at least one actuator moves the shelf and/or the container of the at least one rack from the removal position into the storage position, and
   wherein the cell control unit actuates the gripper to grip the goods stockpiled on and/or in the at least one shelf and/or container, while the at least one shelf and/or container in the removal position is at least partly arranged in front of the rack.

14. The picking system according to claim 13, further comprising at least one object detection device for detecting the goods stockpiled on and/or in the at least one shelf and/or container, wherein the at least one object detection device is arranged to detect the goods while the at least one shelf and/or container is disposed in the removal position, wherein the at least one object detection device is arranged in a position above the at least one shelf and/or container arranged in the removal position, wherein the cell control unit evaluates data of the at least one object detection device and actuates the gripper on a basis of a path planning.

15. The picking system according to claim 14, wherein the object detection device is traversable, wherein the object detection device is traversable in a lateral direction and/or in a height direction along a rack disposed in a picking position, and controlled to be arranged above one of a plurality of shelves and/or containers of the rack from which the goods are to be picked.

16. A picking system for the order-related picking of goods stockpiled in racks, comprising:
- an automated picking cell that includes a gripper for gripping and picking the goods and a cell control unit for actuating the gripper,
- racks including shelves and/or containers on and/or in which goods are stockpiled,
- a transport system by which the racks can be conveyed to at least one picking position in a vicinity of the picking cell, and
- an order management control unit for processing a plurality of picking orders by actuating the transport system and the automated picking cell,
- wherein at least one shelf and/or container of a rack arranged in the picking position can be conveyed from a storage position within the rack into a removal position in which the at least one shelf and/or container is at least partly arranged in front of the rack, the picking system comprising at least one actuator for moving the shelf and/or the container of the at least one rack from the storage position into the removal position and/or from the removal position into the storage position, the at least one actuator being controlled by the order management control unit and/or the cell control unit,
- wherein the at least one actuator is arranged on the at least one rack, wherein each shelf and/or container of the at least one rack is movable by an actuator of the at least one rack from the storage position into the removal position and/or from the removal position into the storage position, wherein the at least one rack includes an electric energy storage device that supplies the actuators with energy, and/or wherein in the picking position the at least one rack is connectable to an energy supply unit in order to supply the actuators with energy, and
- wherein the cell control unit actuates the gripper to grip the goods stockpiled on and/or in the at least one shelf and/or container, while the at least one shelf and/or container in the removal position is at least partly arranged in front of the rack.

17. The picking system according to claim 16, further comprising at least one object detection device for detecting the goods stockpiled on and/or in the at least one shelf and/or container, wherein the at least one object detection device is arranged to detect the goods while the at least one shelf and/or container is disposed in the removal position, wherein the at least one object detection device is arranged in a position above the at least one shelf and/or container arranged in the removal position, wherein the cell control unit evaluates data of the at least one object detection device and actuates the gripper on a basis of a path planning.

18. The picking system according to claim 17, wherein the object detection device is traversable, wherein the object detection device is traversable in a lateral direction and/or in a height direction along a rack disposed in a picking position, and controlled to be arranged above one of a plurality of shelves and/or containers of the rack from which the goods are to be picked.

* * * * *